Patented Aug. 26, 1930

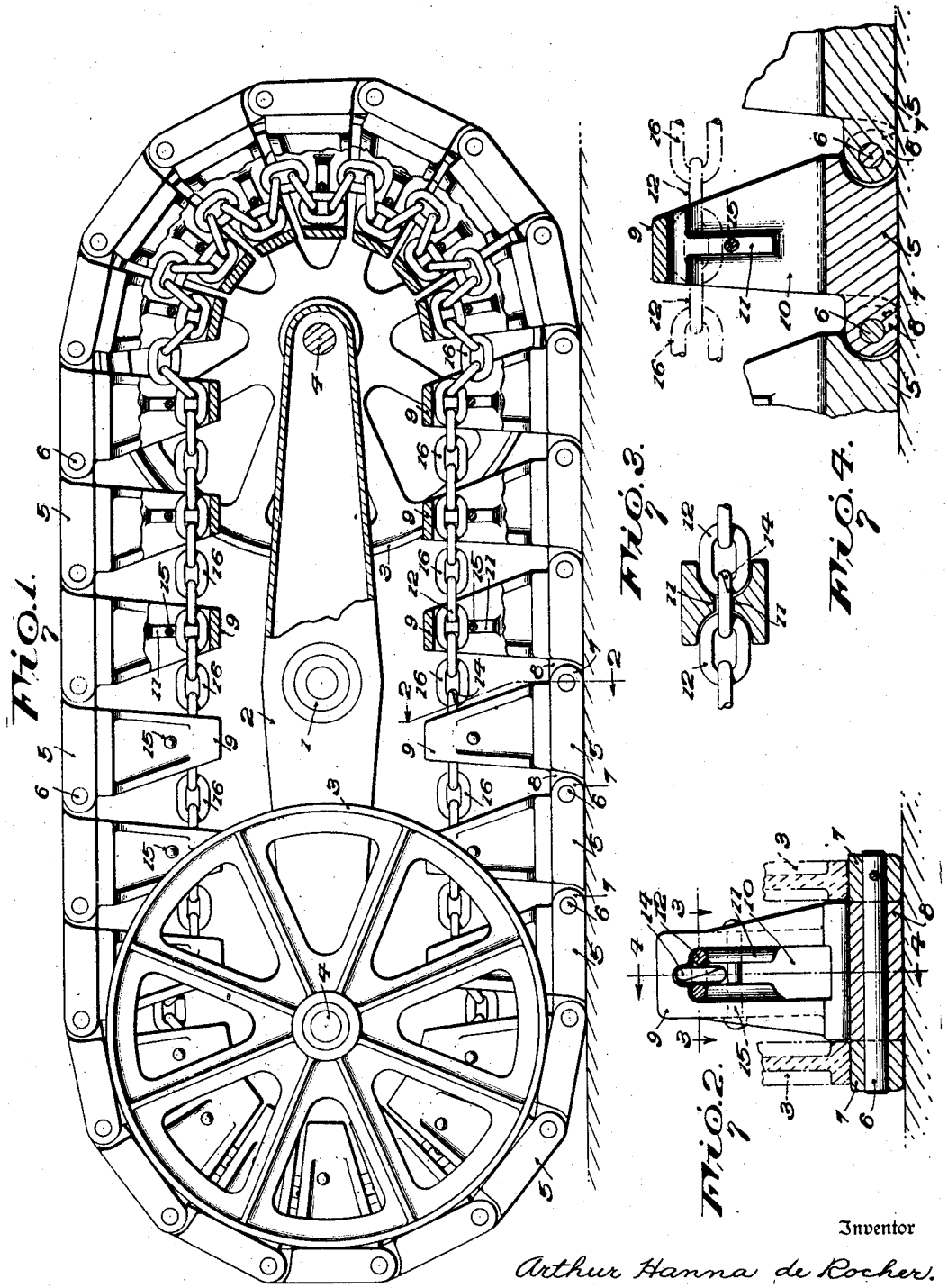

1,773,777

UNITED STATES PATENT OFFICE

ARTHUR HANNA DE ROCHER, OF SEATTLE, WASHINGTON

TREAD CHAIN FOR VEHICLES

Application filed February 5, 1930. Serial No. 426,155.

This invention relates to tread chains for vehicles of the track-laying type for load-carrying vehicles, and has for its object to provide a structure of this character which can be economically constructed and wherein the elements composing the chain may be quickly installed or replaced in an unbroken chain of parts. With this object in view, the invention, generally stated, consists of a series of tread members flexibly connected together in any suitable manner, as by pivots, in a closed circuit, each of which said tread members is provided with an inwardly projected truss element having an opening therethrough, with a suitable chain, such as an ordinary oval-link log chain threaded through the openings in the truss elements with the ends of the chain connected together in a closed circuit. The inner ends of the truss elements are, by the present invention, provided with inwardly projecting ribs forming oppositely facing abutments, the faces of the said abutments being shaped to receive the end of one of the links of the chain, when seated against the abutment. When the chain is of the oval-link type indicated above, preferably one of the links, in a vertical position, is located between the said ribs, and the ends of the links, engaging said last named interposed link, contact with the opposite side of the abutments, suitable retaining means, as a pin, being passed through the truss member just below the chain to hold the parts in operative position.

With the tread chain thus constructed, single elements, i. e. the tread members, trusses, or links of the chain can be readily removed and replaced. Furthermore, all the parts are of simple construction, requiring little or no machining, and the chain connecting the truss member may be of ordinary commercial type readily secured upon the market.

The inventive idea may receive a variety of mechanical expressions, one of which, for the purpose of illustrating the invention, is shown in the accompanying drawings, which drawings, however, are to be taken as illustrative only, and not as defining the limits of the invention, reference being had to the appended claims for this purpose.

In said drawings:

Fig. 1 represents a side elevation, partly in section, of the tread chain, with parts of the vehicle to which it is applied;

Fig. 2 is a vertical section on the line 2—2 of Fig. 1, looking in the direction of the arrow;

Fig. 3 is a sectional plan view taken on the line 3—3 of Fig. 2; and

Fig. 4 is a vertical section on the line 4—4 of Fig. 2 with the chain shown in dotted lines.

Referring to the drawings, in which like reference characters indicate like parts throughout the several views, 1 is a load-supporting axle, and 2 is a beam pivotally mounted on the axle. Shafts 4, 4 are journalled in the opposite ends of the beam 2, the wheels 3, 3 being journalled on the opposite ends of said shafts. The track chain upon which said wheels roll consists of a series of tread members 5 flexibly connected together in a closed circuit passing around the two pairs of wheels journalled on the shafts 4. The particular means for effecting the flexible connection of the treads 5 forms no part of the present invention, but as here shown; said means consists of pins 6 passing through two oppositely disposed ears 7, 7, Fig. 2, and through a portion 8 of the adjacent tread extending between the ears 7, 7. Each tread member is provided on its opposite sides with laterally extending portions forming parallel treads for each pair of wheels.

All of that portion of the structure thus far described may be of the usual or any suitable form, since the specific construction thereof is not of the present invention.

Projecting inwardly from each tread member is a truss element 9, preferably formed integrally with the tread member. This truss element has an opening extending therethrough, these openings in the several truss elements being in a line parallel with the tread chain. At the lower portion of said opening, adjacent the tread member, the opening is enlarged as at 10, and above this enlarged part of the opening, ribs 11, 11 project into the opening so as to leave a narrow vertical channel therebetween. The opposite front and rear faces of these ribs 11 form abutments for receiving the opposing faces of two chain links, 12, 12, Fig. 3, with a third link 14 connecting said links 12, 12, the link 14 lying within the space between the two abutment ribs 11, 11, and the front and rear faces of said abutment ribs being preferably shaped to correspond to the shape of the chain links 12, 12. As here shown, this chain is in the form of an ordinary log chain composed of interlocking oval links and the abutments 11, 11 are therefore arch shaped to receive the said links.

The entire chain, composed of a series of said links, is formed into a closed circuit, the chain extending through each of the truss elements with the links of the chain assembled in relation to the truss elements as clearly illustrated in Figs. 2 and 3. For the purpose of closing the chain, any suitable means may be employed for uniting the two ends of the chain such, for example, as a split link, as illustrated at 14, Fig. 2. Any other suitable means of closing the chain may be employed.

In assembling the parts the tread elements are first pivotally connected together with the truss elements projecting inwardly, i. e. toward the beam 2, and the chain is then passed through the enlarged part 10 of the opening, and the intermediate link 14 is raised edgewise between the abutments 11, 11 with the ends of the links 12, 12 in juxtaposition to said abutments, one on either side. When thus raised into position the chain is retained in such position by means of a pin 15 extending transversely across the truss member. When the chain has thus been passed through each of the truss elements, it is closed by means of the connecting split link 14, or other suitable connecting means.

Between the truss elements, the chain links 12 are connected by an intermediate link or links 16, thus affording the flexibility which permits the several truss elements to assume the position shown in the right hand of Fig. 1 when passing around the wheel, but when the tread chain is laid down on the ground in the position shown at the lower part of Fig. 1, said chain and the truss elements co-act to effectively stiffen the whole structure, to form an effective, approximately rigid track for the wheels.

It will be observed that the elements of my device are approximately free from any required machining of parts, that the chain connecting the truss elements is an ordinary chain, readily purchased upon the market, and that the whole structure is readily assembled and disassembled, whereby broken or worn parts can be quickly removed and new parts inserted. It is thus apparent that the track chain, as a whole, is one that can be constructed at a minimum cost, affords an efficient and reliable tread for the wheels, and can be rapidly and cheaply repaired without the necessity of using special tools or the aid of skilled labor.

What I claim is:

1. In a track chain for vehicles, the combination of a plurality of tread members pivotally connected together in a closed circuit, an inwardly projecting truss element on each tread member, oppositely facing abutments on each truss element, a chain consisting of a series of links connected together in a closed circuit, said chain passing through each truss with a link bearing against each of said abutments, and means retaining said link in said position.

2. In a track chain for vehicles, the combination of a plurality of tread members pivotally connected together in a closed circuit, an inwardly projecting truss element on each tread member, each truss element having an opening therein through which a chain may be passed and oppositely facing abutments adjacent said opening, and a chain passed through said openings with links thereof engaging said abutments, and means retaining the links in such engagement.

3. In a tread chain for vehicles, the combination of a series of tread members flexibly connected together in a closed circuit, an inwardly projecting truss element on each tread member, a chain of closed links in a closed circuit passing through each truss element, oppositely facing abutments on each truss element adjacent its inner end, each of said abutments being engaged by a link of said chain, and means retaining the link in said position.

4. In a tread chain for vehicles, the combination of a series of tread members flexibly connected in a closed circuit, an inwardly projecting hollow truss element on each tread member, a chain composed of links connected together in a closed circuit and passing through each truss element, each of said truss elements having oppositely disposed inwardly extending ribs in operative engagement with links of said chain, and means retaining said ribs and links in operative engagement.

In testimony whereof I have signed this specification.

ARTHUR HANNA de ROCHER.